United States Patent
Morris (10) Patent No.: US 12,105,575 B2
(45) Date of Patent: Oct. 1, 2024

(54) RECONFIGURATION OF A COMPUTING SYSTEM USING A CIRCUIT SWITCH

(71) Applicant: HEWLETT PACKARD ENTERPRISE DEVELOPMENT LP, Houston, TX (US)

(72) Inventor: Terrel Morris, Garland, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 86 days.

(21) Appl. No.: 18/047,731

(22) Filed: Oct. 19, 2022

(65) Prior Publication Data

US 2024/0134441 A1 Apr. 25, 2024
US 2024/0231468 A9 Jul. 11, 2024

(51) Int. Cl.
*G06F 1/3287* (2019.01)
*G06F 13/16* (2006.01)
*G06F 13/40* (2006.01)

(52) U.S. Cl.
CPC ........ *G06F 1/3287* (2013.01); *G06F 13/1652* (2013.01); *G06F 13/4022* (2013.01)

(58) Field of Classification Search
CPC .................................................. G06F 1/3287
See application file for complete search history.

(56) References Cited

U.S. PATENT DOCUMENTS

| | | | |
|---|---|---|---|
| 10,212,497 B2 | 2/2019 | Morris et al. | |
| 11,698,878 B1* | 7/2023 | Douglis | G06F 13/385 |
| | | | 710/313 |
| 2015/0370611 A1* | 12/2015 | Amann | G06F 3/065 |
| | | | 709/216 |
| 2018/0307295 A1* | 10/2018 | Tameem | G06F 1/3253 |
| 2018/0307296 A1* | 10/2018 | Vembu | G06F 1/3296 |
| 2018/0307971 A1* | 10/2018 | Sinha | G06N 3/04 |
| 2018/0308272 A1* | 10/2018 | Appu | G06F 9/54 |

(Continued)

OTHER PUBLICATIONS

Ayar Labs, "Disaggregated System Architectures for Next Generation HPC and AI Workloads", Transcript of video, available online at <https://www.youtube.com/watch?v=Mw1xy0BY2xs>, Aug. 19, 2021, 46 pages.

(Continued)

*Primary Examiner* — Ilwoo Park
*Assistant Examiner* — Aurangzeb Hassan
(74) *Attorney, Agent, or Firm* — Trop, Pruner & Hu, P.C.

(57) ABSTRACT

Example implementations relate to executing a workload in a computing system including processing devices, memory devices, and a circuit switch. An example includes identifying first and second instruction-level portions to be consecutively executed by the computing system; determining a first subset of processing devices and a first subset of memory devices to be used to execute the first instruction-level portion; controlling the circuit switch to interconnect the first subset of processing devices and the first subset of memory devices during execution of the first instruction-level portion; determining a second subset of the processing devices and a second subset of the memory devices to be used to execute the second instruction-level portion; and controlling the circuit switch to interconnect the second subset of processing devices and the second subset of memory devices during execution of the second instruction-level portion.

14 Claims, 8 Drawing Sheets

(56) References Cited

U.S. PATENT DOCUMENTS

| | | | |
|---|---|---|---|
| 2019/0020566 A1* | 1/2019 | Alves | G06F 13/4022 |
| 2020/0210196 A1* | 7/2020 | Ghetie | G06F 1/3203 |
| 2020/0285523 A1 | 9/2020 | Guim Bernat et al. | |
| 2021/0200546 A1* | 7/2021 | Lemay | G06F 12/145 |
| 2021/0311895 A1 | 10/2021 | Das Sharma | |

OTHER PUBLICATIONS

Y. London et al., "Energy Efficiency Analysis of Comb Source Carrier-Injection Ring-Based Silicon Photonic Link", IEEE Journal of Selected Topics in Quantum Electronics, vol. 26, No. 2, Mar.-Apr. 2020, pp. 1-13.

Becker et al., "Scaling Genomics Data Processing with Memory-Driven Computing to Accelerate Computational Biology", 2020, International Conference on High Performance Computing, Springer, Cham., 17 pages.

Debendra Das Sharma, "Compute Express Link", White Paper, Oct. 6, 2022, 3 pages.

Guo, X., "Machine-learning Assisted Next Generation Disaggregated Data Center and HPC Architectures Based on Nanoseconds Optical Switches", Dec. 14, 2021, 166 pages.

HPE, "HPE Superdome Flex Server Architecture and RAS", Technical white paper, 2021, 22 pages, <https://www.hpe.com/us/en/pdfViewer.html?docId=a00036491&jumpId=in_pdfviewer_904454dc-0b08-4a50-9aa1-ad096a9d420f_gaiw>.

Kimberly Keeton, "Memory-Driven Computing," in FAST 2017, <https://www.usenix.org/sites/default/files/conference/protected-files/fast17_slides_keeton.pdf>, 61 Pages.

Kurt Lender, "Compute Express Link™ (CXL ™): A Coherent Interface for Ultra-High-Speed Transfers,", Flash Memory Summit, 2019, 22 pages.

Business Wire, "Lightmatter Raises $80M Series B and Brings Photonic Compute Chip to Market That Accelerates AI With 10x-Plus Speed and Energy Advantage", available online at <https://www.businesswire.com/news/home/20210506005271/en/>, 2022, 3 pages.

Rockport Networks Inc., "Technology Primer—Rockport Switchless Network," Oct. 2021, Version 1.0, 17 pages.

Samsung, "Samsung Unveils Industry-First Memory Module Incorporating New CXL Interconnect Standard", available online at <https://news.samsung.com/global/samsung-unveils-industry-first-memory-module-incorporating-new-cxl-interconnect-standard>, May 11, 2021, 4 pages.

Timothy Prickett Morgan, "Finally, a Coherent Interconnect Strategy: CXL Absorbs Gen-Z", available online at <https://www.nextplatform.com/2021/11/23/finally-a-coherent-interconnect-strategy-cxl-absorbs-gen-z/>, Nov. 23, 2021, 9 pages.

Wikipedia, "Circuit switching", available online at <<https://en.wikipedia.org/w/index.php?title=Circuit_switching&oldid=1111024297>. Sep. 18, 2022, 4 pages.

Wikipedia, "Optical mesh network", available online at <https://en.wikipedia.org/w/index.php?title=Optical_mesh_network&oldid=1105622508>. Aug. 21, 2022, 8 pages.

Wikipedia, "Packet switching", available online at <https://en.wikipedia.org/w/index.php?title=Packet_switching&oldid=1115277426>, Oct. 10, 2022, 27 pages.

Wikipedia, "PCI Express", available online at <<https://en.wikipedia.org/w/index.php?title=PCI_Express&oldid=1115953686> Oct. 14, 2022, 24 pages.

* cited by examiner

Machine Readable Medium
800

810
Identify first and second instruction-level portions to be consecutively executed by a computing system, the computing system comprising a plurality of processing devices, a plurality of memory devices, and a circuit switch

820
Determine a first subset of the processing devices and a first subset of the memory devices to be used to execute the first instruction-level portion

830
Control the circuit switch to interconnect the first subset of the processing devices and the first subset of the memory devices during an execution of the first instruction-level portion

840
Determine a second subset of the processing devices and a second subset of the memory devices to be used to execute the second instruction-level portion

850
Control the circuit switch to interconnect the second subset of the processing devices and the second subset of the memory devices during an execution of the second instruction-level portion

FIG. 8

RECONFIGURATION OF A COMPUTING SYSTEM USING A CIRCUIT SWITCH

BACKGROUND

Modern computer systems may include any number of components, such as a central processing unit (CPU), memory, chipsets, and/or many other devices coupled together by interconnections (e.g., a computer bus, a network, etc.). An interconnection may transfer data between devices or components inside a computer, as well as between computers. For example, the interconnection may be used to read a data element from a memory, and provide the data element to a processor.

BRIEF DESCRIPTION OF THE DRAWINGS

Some implementations are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a computing system may include multiple computing resources connected via a network fabric. For example, such computing resources may include processing devices, memory devices, accelerator devices, storage devices, and so forth. In some examples, a subset of the computing resources (referred to herein as a "temporary configuration") may be allocated to execute a different computing job. Further, upon completing its computing job, the temporary configuration may be deleted, and its computing resources may be made available to be reconfigured into new temporary configuration(s). However, in some computing systems, reconfiguring the temporary configurations may involve an amount of time (referred to herein as the "lag time") that is relatively long. For example, in a computing system using packet-switched networked fabric, a significant amount of time may be required to route data in packets (e.g., to form, transmit, buffer, and decode the data packets). Accordingly, in such computing systems, the use of a temporary configuration may not be feasible for jobs of relatively short duration (e.g., jobs including a relatively small number of instructions).

In accordance with some implementations of the present disclosure, a computing system may include a circuit switch to form temporary configurations of computing resources. The circuit switch may use electrical or optical circuitry to rapidly route data signals between computing resources, and may thereby allow the temporary configurations to be initiated with a relatively short lag time (e.g., one percent of the lag time when using a packet switch). In some implementations, a controller may analyze an upcoming workload of the computing system, and may divide the workload into portions at multiple levels of granularity. For example, the controller may divide the upcoming workload into a sequence of portions, where the portions correspond to jobs, microservices, or instructions. For each workload portion, the controller may determine whether using a temporary configuration would improve the performance of the computing system, and if so, may initiate the temporary configuration to execute the workload portion.

In some implementations, because the circuit switch can initiate the temporary configuration with a relatively short lag time, it may be feasible to use a temporary configuration to execute workload portions of relatively short duration (e.g., for a relatively small number of instructions). As such, the execution of the workload may be optimized at multiple levels of granularity. In this manner, some implementations may provide improved execution of the workload. Further, because the computing resources can be dynamically reallocated between workloads during execution, some implementations may allow the computing system to increase the number of workloads that are executed at the same time. Various details of the use of temporary configurations are described below with reference to FIGS. 1-8.

Figure 1:
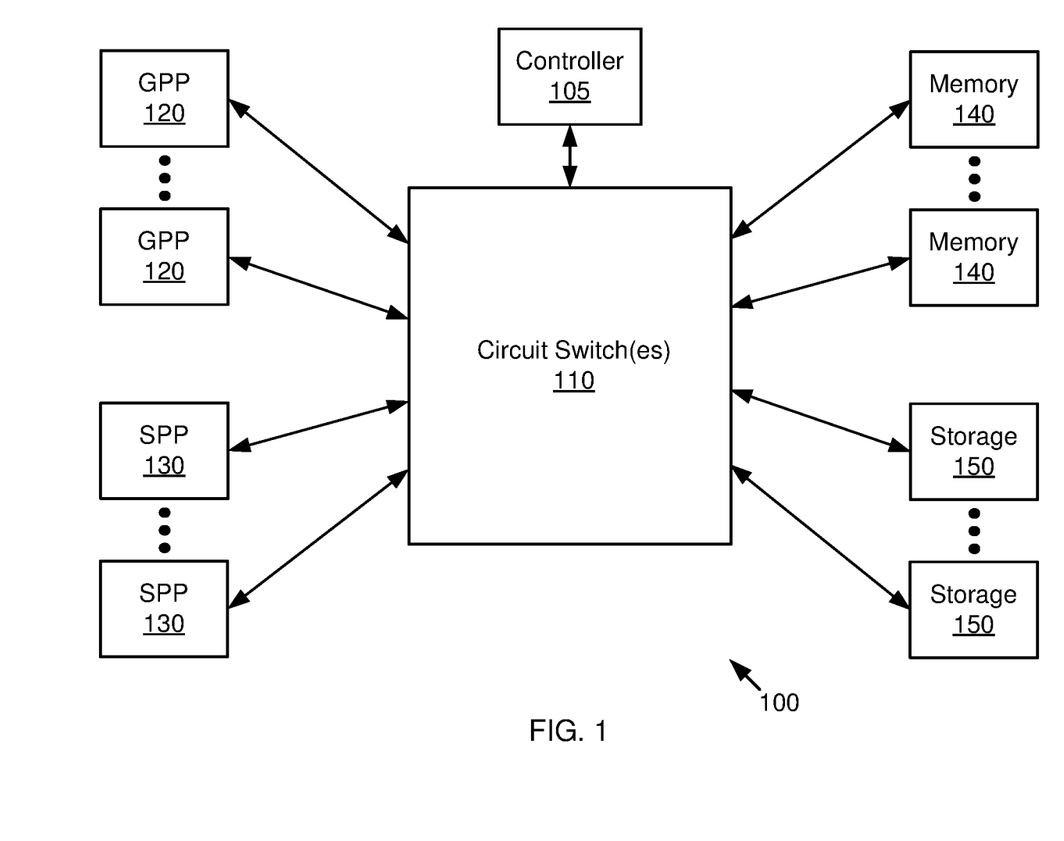
FIG. 1 is a schematic diagram of an example computing system, in accordance with some implementations.

FIG. 1—Example Computing System

FIG. 1 shows an example computing system 100, in accordance with some implementations. The computing system 100 may include one or more circuit switch(es) 110 to provide interconnections between any number of computing resources. Such computing resources may include general purpose processors (GPPs) 120, special purpose processors (SPPs) 130, memory devices 140, storage devices 150, and other computing resources (not shown). For example, the general purpose processors 120 may include various types of central processing units (CPUs), Systems on a Chip (SoCs), processing cores, and so forth. The special purpose processors 130 may include various types of specialized processing devices, such as graphics processing units (GPUs), digital signal processors (DSPs), math processors, encryption processors, network processors, and so forth. The memory devices 140 may include various types of memory such as dynamic random-access memory (DRAM), static random-access memory (SRAM), and so forth. The storage devices 150 may include one or more non-transitory storage media such as hard disk drives (HDDs), solid state drives (SSDs), optical disks, and so forth, or a combination thereof. In some implementations, the computing system 100 and the included components may operate in accordance with Compute Express Link (CXL) protocol(s) or specification(s) (e.g., the CXL 1.1 Specification).

In some implementations, the circuit switch 110 may be an electrical circuit switch that routes signals within the electrical domain (e.g., as electronic signals). In other implementations, the circuit switch 110 may be an optical circuit switch that routes signals within the optical domain (e.g., as photonic signals), without converting the signals to the electrical domain. The circuit switch 110 may be controlled by the controller 105. In some examples, the controller 105 may be implemented via hardware (e.g., electronic circuitry) or a combination of hardware and programming (e.g., comprising at least one processor and instructions executable by the at least one processor and stored on at least one machine-readable storage medium).

In some implementations, the controller 105 may analyze the upcoming workload of the computing system 100, and may divide the workload into portions at multiple levels of granularity. For example, the controller may divide the upcoming workload into a sequence of portions, where each portion corresponds to one or more jobs, one or more microservices, or one or more instructions. As used herein, the term "microservice" may refer to a software component which performs a single function, includes multiple instructions, and executes independently of other microservices. Further, as used herein, the term "job" may refer to a software application or module that includes multiple microservices.

For each workload portion, the controller 105 may determine whether to initiate a temporary configuration to execute the workload portion. If so, the controller 105 may allocate subsets of the resources to form the temporary configuration. The temporary configuration may be used to execute the corresponding workload portion. An example operation for using temporary configurations is described below with reference to FIG. 2.

In some implementations, the computing system 100 may process different workloads at the same time. For example, the circuit switch(es) 110 may be configured so that the resources of the computing system 100 are separated into a first resource grouping allocated to a first workload and a second resource grouping allocated to a second workload. In such implementations, different workloads may be separately executed in different resource groupings (e.g., in parallel fashion). Each workload may be associated with a different user entity (e.g., client, application, organization, etc.). In some implementations, the controller 105 may initiate one or more temporary configurations within each resource grouping (i.e., for each separate workload). For example, within a resource grouping, the available resources may be allocated to two or more temporary configurations (e.g., to execute two workload portions in parallel). In another example, within a resource grouping, the available resources may be initially allocated to a first temporary configuration to execute a first workload portion, may be released upon completion of the first workload portion, and may then be allocated to a second temporary configuration to execute a second workload portion.

Figure 2:
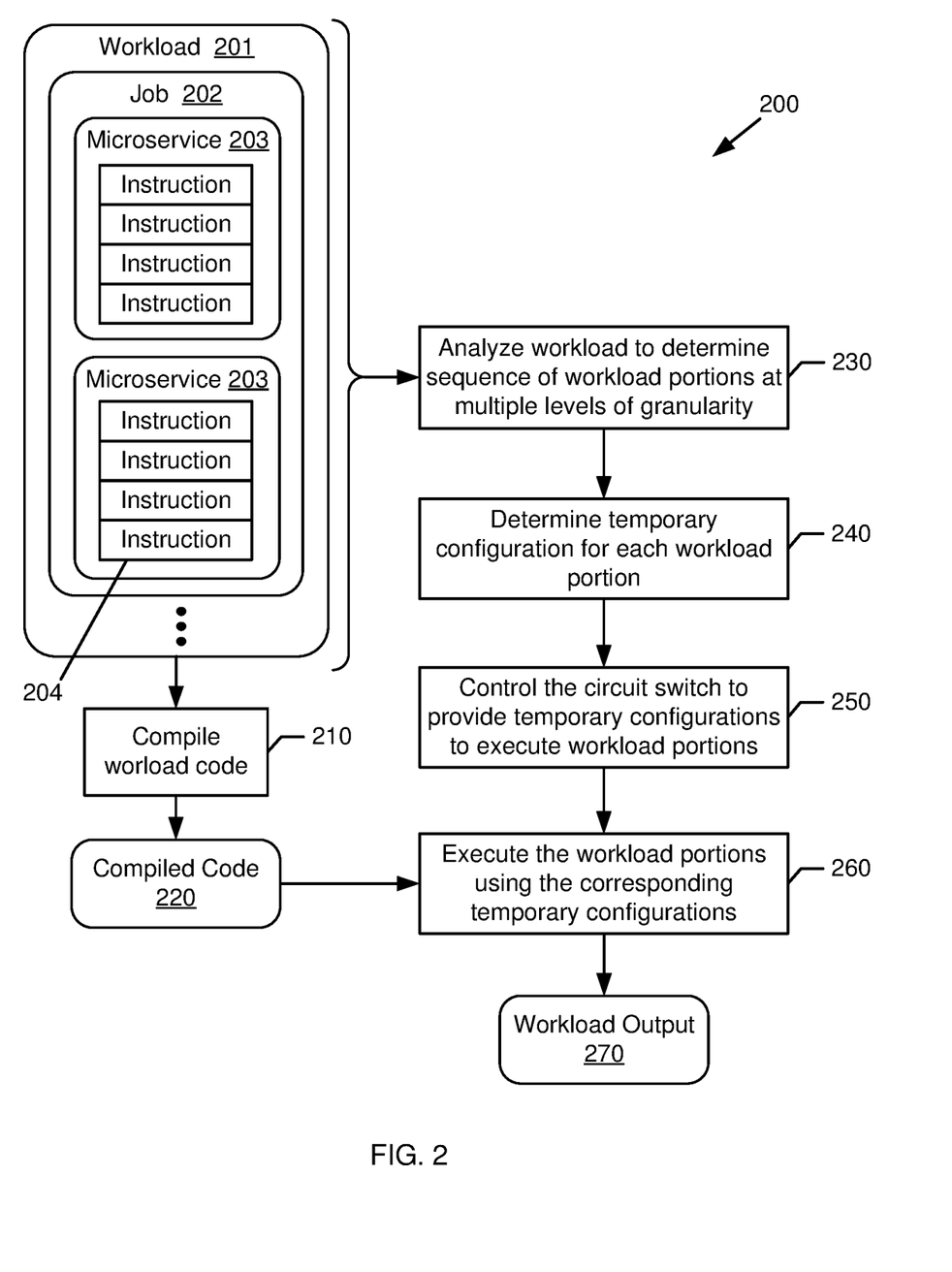
FIG. 2 is an illustration of an example operation, in accordance with some implementations.

FIG. 2—Example Operation

FIG. 2 shows an illustration of an example operation 200, in accordance with some implementations. The operation 200 may be performed by the computing system 100 (shown in FIG. 1). As shown in FIG. 2, block 210 may include compiling the source code of a workload 201, thereby generating the compiled code 220 to be executed. The workload 201 is composed of any number of jobs 202 (e.g., programs, applications, modules, etc.). Each job 202 is composed of any number of microservices 203. Further, each microservices 203 is composed of any number of instructions 204.

Block 230 may include analyzing the source code to determine a sequence of workload portions at multiple levels of granularity (e.g., job(s), microservice(s), or instruction(s)). Block 240 may include determining a temporary configuration for each workload portion. Block 250 may include controlling the circuit switch to provide the temporary configurations for executing the workload portions. Block 260 may include executing the workload portions using the corresponding temporary configurations, and thereby generating the workload output 270.

In some implementations, each temporary configuration may be a subset of the computing resources included in a computing system (e.g., a subset of the GPPs 120, SPPs 130, memory devices 140, and/or storage devices 150 shown in FIG. 1) that is selected to execute a corresponding workload portion. For example, for a workload portion that includes performing data encryption, the temporary configuration may include at least one encryption processor to perform the encryption process, as well as sufficient memory to store variables and other data used during the encryption process. Further, to initiate the temporary configuration, a circuit switch (e.g., circuit switch 110 shown in FIG. 1) may be controlled to provide the appropriate interconnections between the computing resources included in the temporary configuration. Some examples of temporary configurations are described below with reference to FIGS. 3A-3D.

In some implementations, each workload portion may be defined as a job portion, a microservice portion, or an instruction-level portion. As used herein, the term "job portion" refers to program code to perform one or more jobs. Further, the term "microservice portion" refers to program code to perform one or more microservices. Furthermore, the term "instruction-level portion" refers to program code to perform one or more iterations of a particular instruction. For example, an instruction-level portion may include a calculation instruction and associated loop instruction(s) to repeat the calculation instruction for a given number of iterations. In this example, the instruction-level portion may be referred to as a "looped instruction" that is executed in multiple iterations. In another example, an instruction-level portion may include only a single calculation instruction that is executed once.

In some implementations, each workload portion may be determined as a continuous portion for which execution can be accelerated or otherwise improved by using a particular temporary configuration of the computing system. For example, if the workload includes two adjacent instructions, and if these two instructions are most rapidly executed when using a different temporary configuration for each of the two instructions, then these two instructions may be identified as two separate instruction-level portions. In another example, if the workload includes two adjacent microservices, and if these two microservices are most rapidly executed by using the same temporary configuration for both microservices, then these two microservices may together be identified as a single microservice portion.

FIGS. 3A-3D—Example Temporary Configurations

FIGS. 3A-3D show example temporary configurations, in accordance with some implementations. For example, these example temporary configurations may be implemented in the computing system 100 (shown in FIG. 1).

Figure 3A:
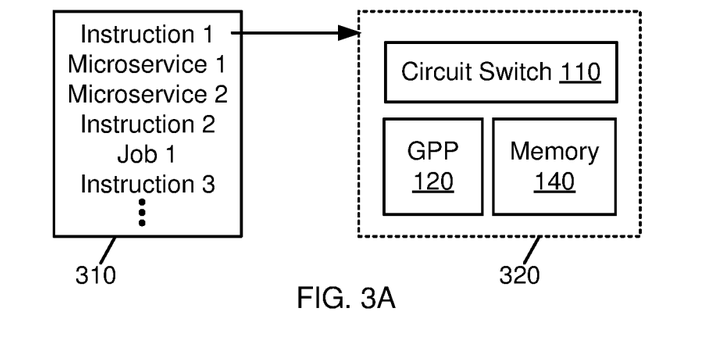
FIGS. 3A-3D are illustrations of example configurations, in accordance with some implementations.

Referring now to FIG. 3A, shown is an example sequence 310 of workload portions. In this example, the first workload portion (instruction-level portion "Instruction 1") in the sequence 310 is analyzed to determine a first temporary configuration 320. As shown, the first temporary configuration 320 includes a single GPP 120 and a single memory device 140 connected by the circuit switch 110. For example, the first workload portion may be a relatively simple instruction-level portion that does not require any specialized processing or a large amount of memory.

Figure 3B:
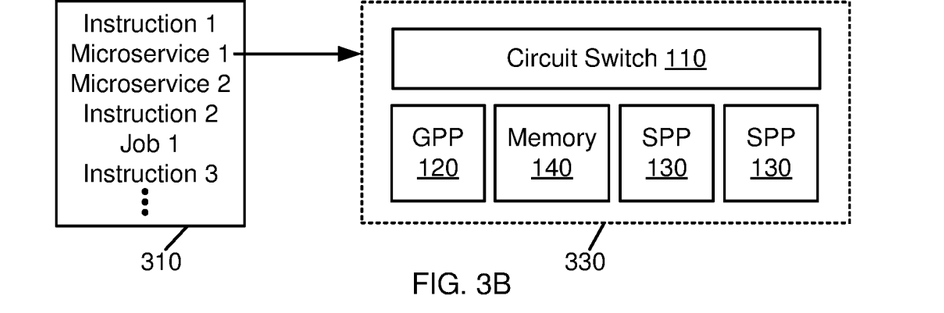

Referring now to FIG. 3B, the second workload portion ("Microservice 1") in the sequence 310 is analyzed to determine a second temporary configuration 330. As shown, the second temporary configuration 330 includes a single GPP 120, a single memory device 140, and two SPPs 130 connected by the circuit switch 110. For example, the second workload portion may be a microservice portion that includes video signal processing, and therefore may require multiple SPPs 130 that are graphics accelerators.

Figure 3C:
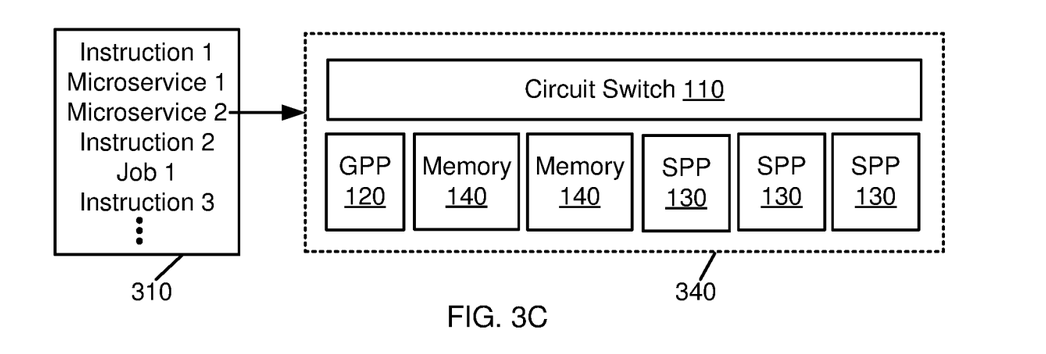

Referring now to FIG. 3C, the third workload portion ("Microservice 2") in the sequence 310 is analyzed to determine a third temporary configuration 340. As shown, the third temporary configuration 340 includes a single GPP 120, two memory devices 140, and three SPPs 130 connected by the circuit switch 110. For example, the third workload portion may be a microservice portion that includes complex encryption calculations, and therefore may require multiple SPPs 130 that are encryption accelerators.

Figure 3D:
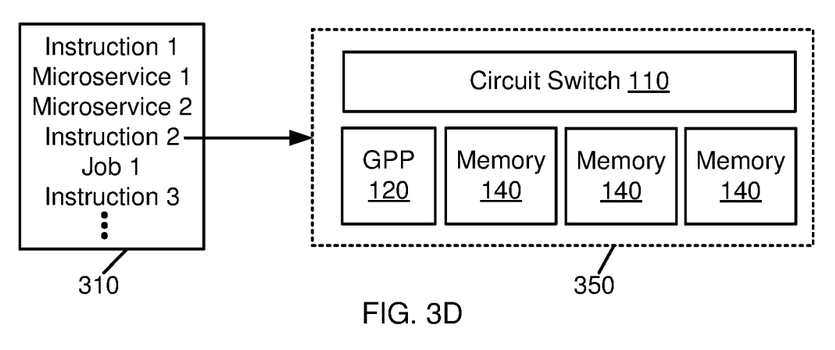

Referring now to FIG. 3D, the fourth workload portion (instruction-level portion "Instruction 2") in the sequence 310 is analyzed to determine a fourth temporary configuration 350. As shown, the fourth temporary configuration 350 includes a single GPP 120 and three memory devices 140 connected by the circuit switch 110. For example, the fourth workload portion may be a looped instruction that performs multiple iterations to modify a very large data matrix in memory, and therefore may require multiple memory devices 140 to maintain the data matrix in memory.

Figure 4:
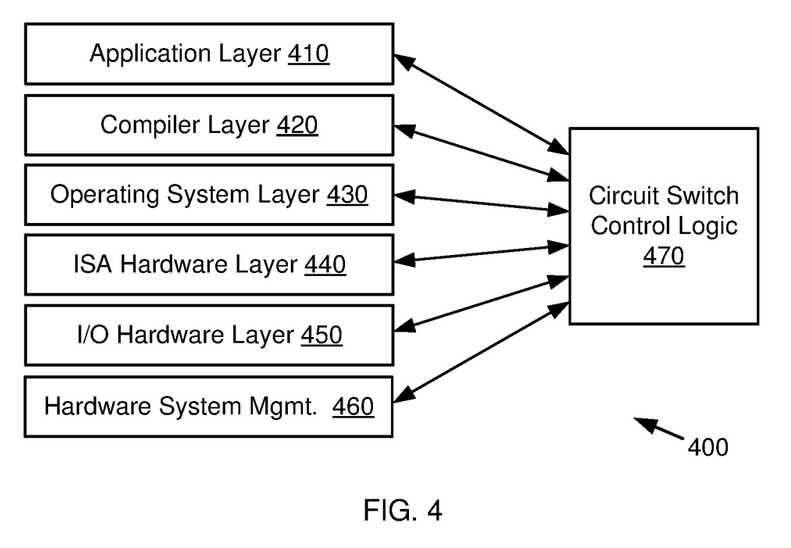
FIG. 4 is an illustration of example software interfaces, in accordance with some implementations.

FIG. 4—Example Software Interfaces

FIG. 4 shows an illustration of example software interfaces, in accordance with some implementations. The circuit switch control logic 470 may analyzing an upcoming workload of a computing system, and may determine a sequence of workload portions at multiple levels of granularity. The circuit switch control logic 470 may determine whether to initiate temporary configurations for the workload portions, and if so, may cause a circuit switch to provide the temporary configurations for executing the workload portions. The circuit switch control logic 470 may be implemented in a hardware controller (e.g., controller 105 shown in FIG. 1), in software executed by a controller, or a combination thereof. In some implementations, the circuit switch control logic 470 may interact with multiple software layers of the computing system to determine whether to initiate each temporary configuration. For example, as shown in FIG. 4, the circuit switch control logic 470 may interact with an application layer 410, a compiler layer 420, an operating system layer 430, an instruction set architecture (ISA) hardware layer 440, an input/output (I/O) hardware layer 450, and a hardware system management layer 460.

Figure 5:
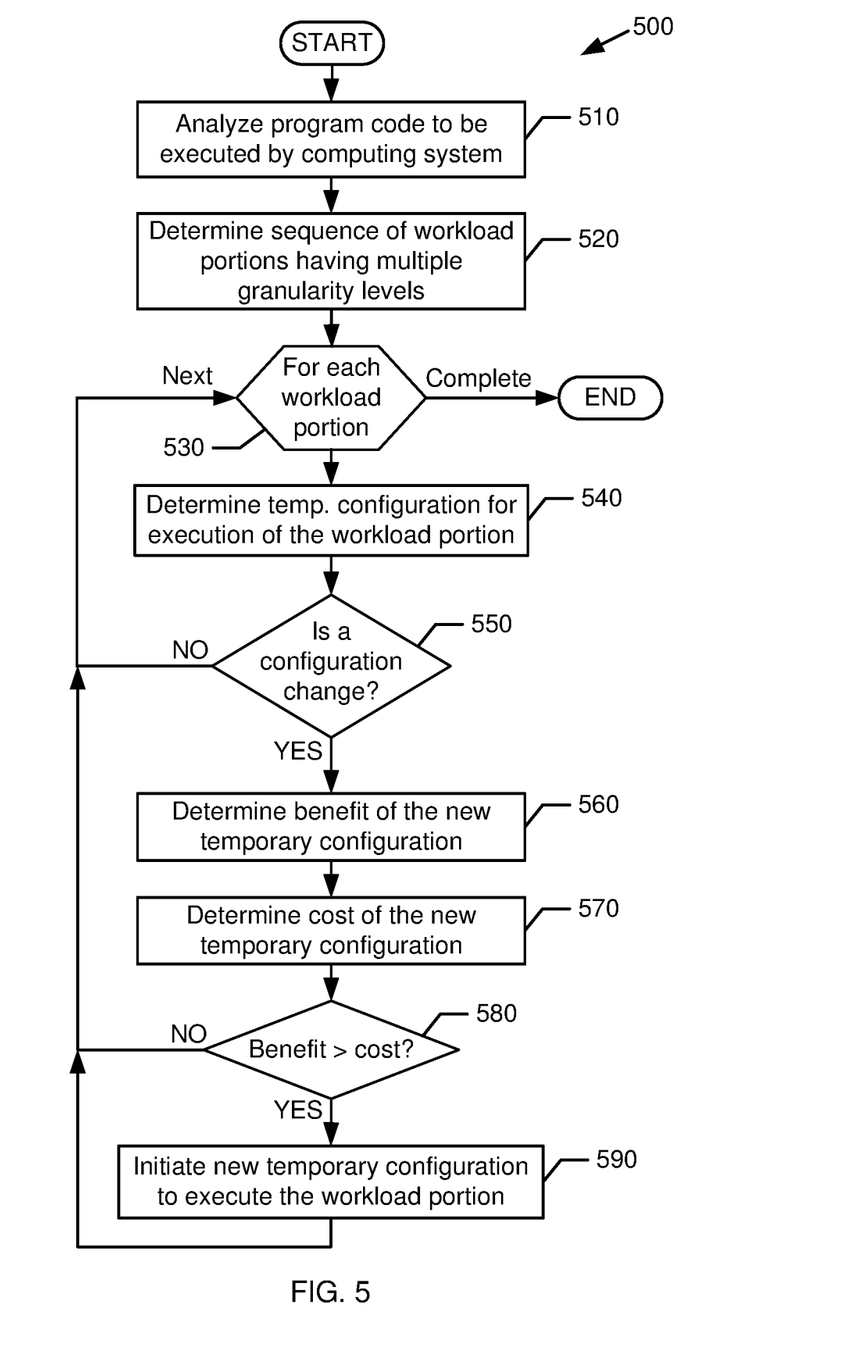
FIG. 5 is an illustration of an example process, in accordance with some implementations.

FIG. 5—Example Process for Initiating a Temporary Configuration

Referring now to FIG. 5, shown is an example process 500 for intimating a temporary configuration, in accordance with some implementations. The process 500 may be performed by a controller (e.g., controller 105 shown in FIG. 1) executing instructions. The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 are described below with reference to FIGS. 1-4, which show examples in accordance with some implementations. However, other implementations are also possible.

Block 510 may include analyzing program code to be executed by computing system. Block 520 may include determining a sequence of workload portions having multiple granularity levels. For example, referring to FIGS. 1-3A, the controller 105 analyzes the source code of the upcoming workload 201, and identifies a sequence 310 of workload portions at multiple levels of granularity (e.g., jobs, microservices, instructions).

At block 530, a loop (defined by blocks 530-590) may be entered to process each workload portion. Block 540 may include determining a temporary configuration for execution of the current workload portion. Decision block 550 may include determining whether the temporary configuration is a change from the current system configuration. If not ("NO"), the process 500 may return to block 530 (e.g., to process another workload portion). For example, referring to FIGS. 1-3A, the controller 105 determines the first temporary configuration 320 to execute the first workload portion (instruction-level portion "Instruction 1"), and determines whether the first temporary configuration 320 is different from the currently existing configuration of the computing system being used to execute the workload 210.

Referring again at FIG. 5, if it is determined at decision block 550 that the temporary configuration is a change from the current system configuration ("YES"), the process 500 may continue at block 560, including determining the performance benefit of the new temporary configuration. Block 570 may include determining the performance cost of the new temporary configuration. Decision block 580 may include determining whether the performance benefit exceeds the performance cost. If not ("NO"), the process 500 may return to block 530 (e.g., to process another workload portion). For example, referring to FIGS. 1-3A, the controller 105 determines that the first temporary configuration 320 is different from the currently existing configuration of the computing system 100, and in response the controller 105 calculates an estimated performance improvement when using the temporary configuration to execute the workload portion (e.g., the reduction in execution time, energy saving, etc.). Further, the controller 105 calculates an estimated performance cost to initiate the temporary configuration (e.g., loss of processing time while the computing system is being reconfigured, energy cost, etc.). The controller 105 may determine whether to initiate the temporary configuration based on a comparison of the performance improvement to the performance cost. In some implementations, the performance benefit may be determined based in part on the number of iterations that the workload portion is repeated. For example, for an instruction-level portion that is a looped instruction, the performance benefit may increase as the number of iterations of the looped instructions is increased.

In some implementations, the decision of whether to initiate the temporary configuration may be further based on the relative priority or importance of different temporary configuration that could be allocated the same computing resource(s). For example, if two different temporary configurations both require a particular processing device, the processing device may be allocated to the temporary configuration having the higher priority level (e.g., based on service level agreement (SLA)).

Referring again at FIG. 5, if it is determined at decision block 580 that the performance benefit exceeds the performance cost ("YES"), the process 500 may continue at block 590, including initiating the new temporary configuration to execute the workload portion. After block 590, the process 500 may return to block 530 (e.g., to process another workload portion). After all workload portions are completed at block 530, the process 500 may be completed. For example, referring to FIGS. 1-3A, the controller 105 determines that the performance benefit of using the new temporary configuration exceeds the performance cost of initiating the new temporary configuration. In response to this determination, the controller 105 deallocates the computing resources used by a previous temporary configuration (if any), and initiates the new temporary configuration. When initiating the new temporary configuration, the controller 105 primes a memory device 140 for use in executing the workload portion, controls a circuit switch 110 to provide the data paths for the temporary configuration, and validates the changes to the circuit switch 110. Further, the controller 105 gives the processing devices (e.g., GPPs 120 and/or SPP 130) access to the primed memory device 140 via the circuit switch 110, and the processing devices execute the workload portion.

Figure 6:
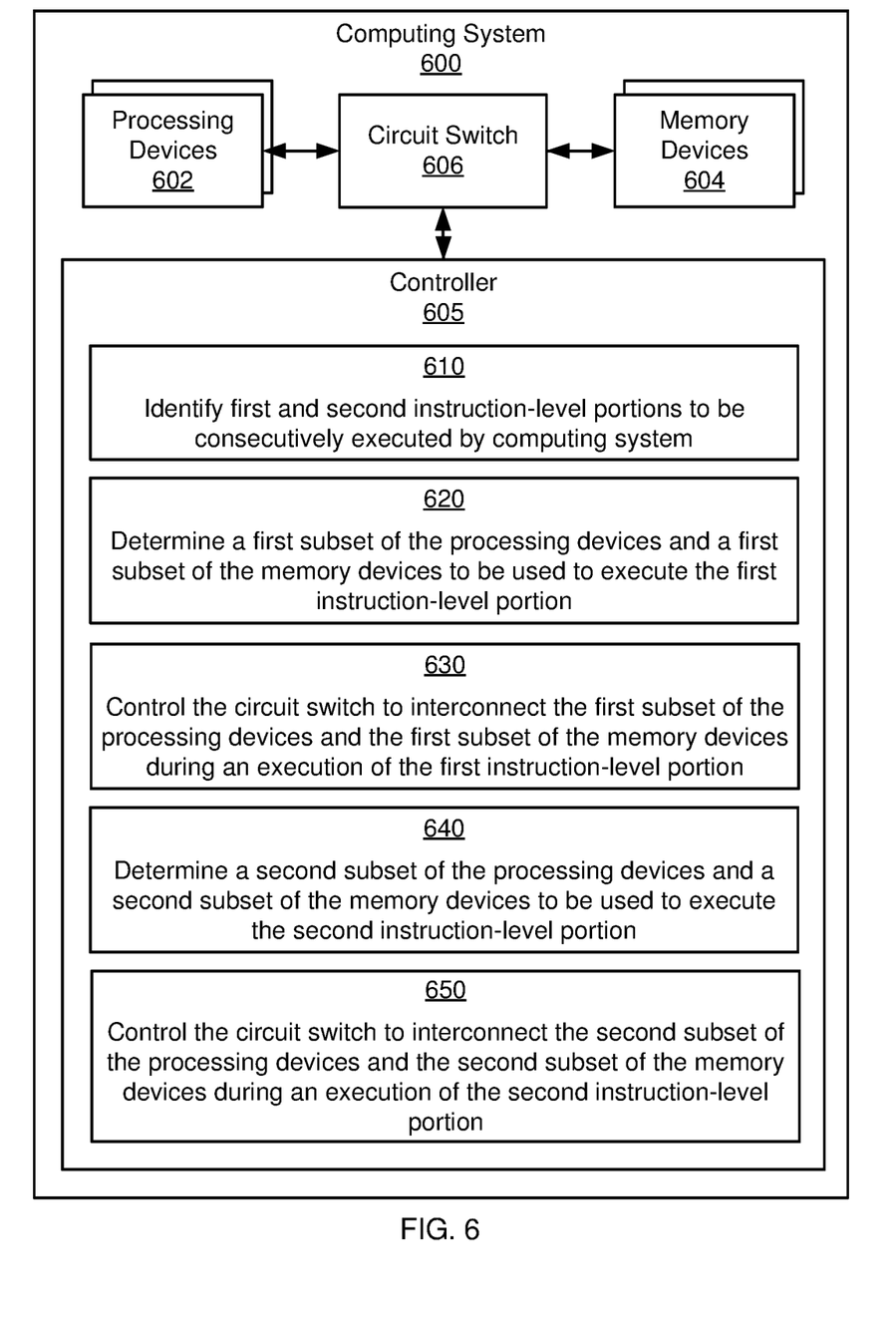
FIG. 6 is a schematic diagram of an example computing system, in accordance with some implementations.

FIG. 6—Example Computing System

FIG. 6 shows a schematic diagram of an example computing system 600. In some examples, the computing system 600 may correspond generally to some or all of the computing system 100 (shown in FIG. 1). As shown, the computing system 600 may include processing devices 602, at least one circuit switch 606, memory devices 604, and a controller 605. In some implementations, the controller 605 may be hardware processor executing instructions 610-650. The instructions 610-650 may be stored in a non-transitory machine-readable storage.

Instruction 610 may be executed to identify first and second instruction-level portions to be consecutively executed by the computing system. Instruction 620 may be executed to determine a first subset of the processing devices and a first subset of the memory devices to be used to execute the first instruction-level portion. Instruction 630 may be executed to control the circuit switch to interconnect the first subset of the processing devices and the first subset of the memory devices during an execution of the first instruction-level portion. For example, referring to FIGS. 1-3A, the controller 105 analyzes the source code of the upcoming workload 201, and identifies a sequence 310 of workload portions at multiple levels of granularity (e.g., jobs, microservices, instructions). The controller 105 determines a first temporary configuration to execute a first instruction-level portion (e.g., a looped instruction) in the workload sequence, and controls the circuit switch 110 and other system components to provide the first temporary configuration. The first instruction-level portion is executed using the second temporary configuration of the computing system 100.

Referring again to FIG. 6, instruction 640 may be executed to determine a second subset of the processing devices and a second subset of the memory devices to be used to execute the second instruction-level portion. Instruction 650 may be executed to control the circuit switch to interconnect the second subset of the processing devices and the second subset of the memory devices during an execution of the second instruction-level portion. For example, referring to FIGS. 1-3A, the controller 105 determines a second temporary configuration to execute a second instruction-level portion that immediately follows the first instruction-level portion, and controls the circuit switch 110 and other system components to provide the second temporary configuration. The second instruction-level portion is then executed using the second temporary configuration of the computing system 100.

Figure 7:
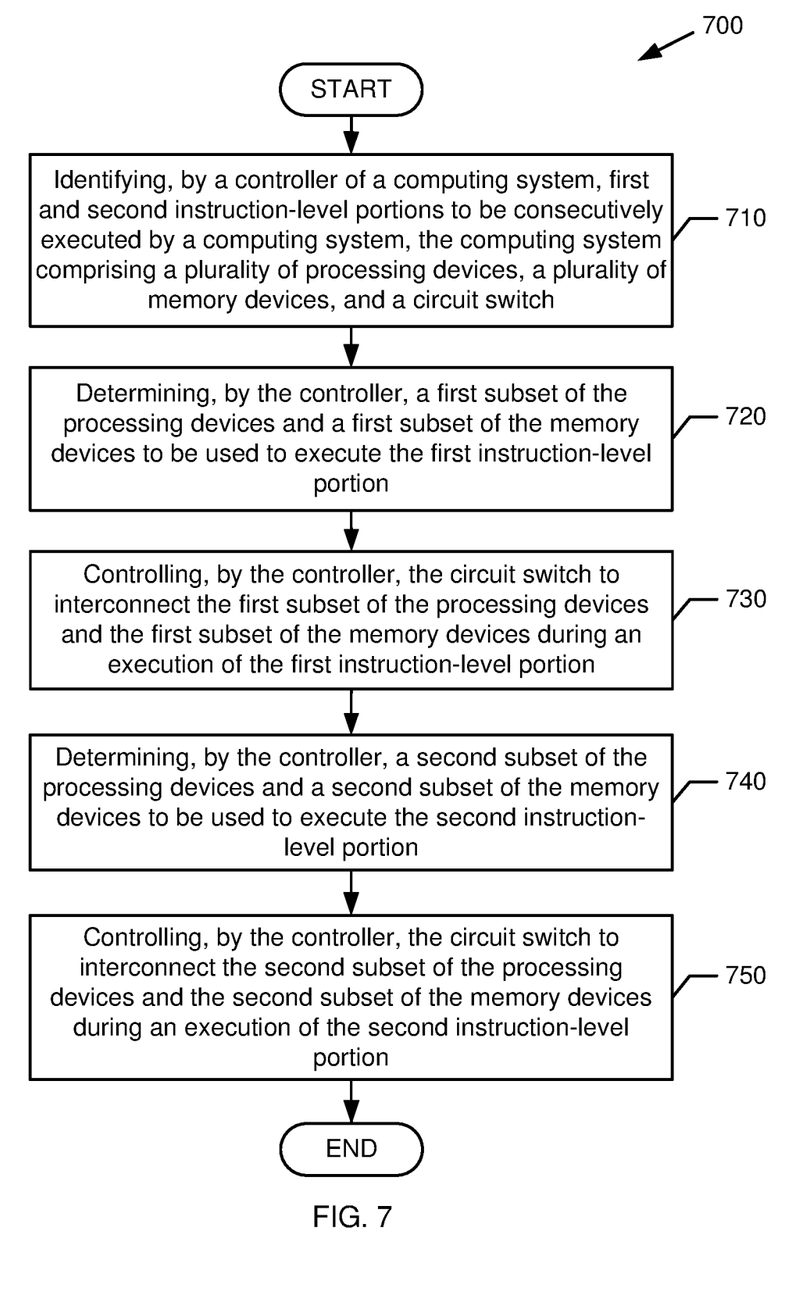
FIG. 7 is an illustration of an example process, in accordance with some implementations.

FIG. 7—Example Process

Referring now to FIG. 7, shown is an example process 700, in accordance with some implementations. The process 700 may be performed by a controller executing instructions (e.g., controller 105 shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 710 may include identifying, by a controller of a computing system, first and second instruction-level portions to be consecutively executed by a computing system, the computing system comprising a plurality of processing devices, a plurality of memory devices, and a circuit switch. Block 720 may include determining, by the controller, a first subset of the processing devices and a first subset of the memory devices to be used to execute the first instruction-level portion. Block 730 may include controlling, by the controller, the circuit switch to interconnect the first subset of the processing devices and the first subset of the memory devices during an execution of the first instruction-level portion.

Block 740 may include determining, by the controller, a second subset of the processing devices and a second subset of the memory devices to be used to execute the second instruction-level portion. Block 750 may include controlling, by the controller, the circuit switch to interconnect the second subset of the processing devices and the second subset of the memory devices during an execution of the second instruction-level portion. After block 750, the process 700 may be completed.

Figure 8:
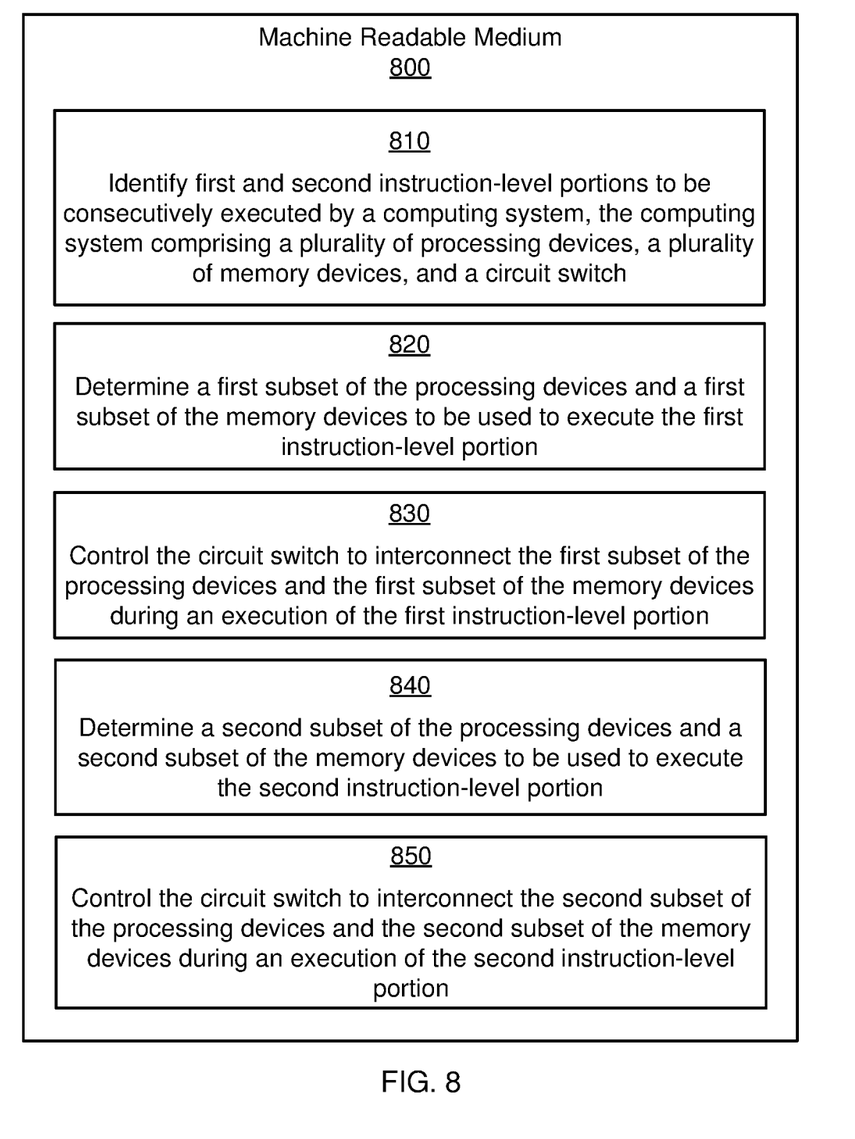
FIG. 8 is a diagram of an example machine-readable medium storing instructions in accordance with some implementations.

FIG. 8—Example Machine-Readable Medium

FIG. 8 shows a machine-readable medium 800 storing instructions 810-850, in accordance with some implementations. The instructions 810-850 can be executed by a single processor, multiple processors, a single processing engine, multiple processing engines, and so forth. The machine-readable medium 900 may be a non-transitory storage medium, such as an optical, semiconductor, or magnetic storage medium.

Instruction 810 may be executed to identify first and second instruction-level portions to be consecutively executed by a computing system, the computing system comprising a plurality of processing devices, a plurality of memory devices, and a circuit switch. Instruction 820 may be executed to determine a first subset of the processing devices and a first subset of the memory devices to be used to execute the first instruction-level portion. Instruction 830 may be executed to control the circuit switch to interconnect the first subset of the processing devices and the first subset of the memory devices during an execution of the first instruction-level portion.

Instruction 840 may be executed to determine a second subset of the processing devices and a second subset of the memory devices to be used to execute the second instruction-level portion. Instruction 850 may be executed to control the circuit switch to interconnect the second subset of the processing devices and the second subset of the memory devices during an execution of the second instruction-level portion.

In accordance with some implementations of the present disclosure, a computing system may include a circuit switch to form temporary configurations of computing resources. The circuit switch may use electrical or optical circuitry to rapidly route data signals between computing resources, and may thereby allow the temporary configurations to be initiated with a relatively short lag time. A controller may analyze an upcoming workload to identify workload portions at multiple levels of granularity, and may determine temporary configurations of the computing system to execute the workload portions. In this manner, some implementations may provide faster and/or more efficient execution of the workload, and may thereby improve the performance of the computing system.

Note that, while FIGS. 1-8 show various examples, implementations are not limited in this regard. For example, referring to FIG. 1, it is contemplated that the computing system 100 may include additional devices and/or components, fewer components, different components, different arrangements, and so forth. In another example, it is contemplated that the functionality of the controller 105 described above may be included in any another engine or software of the computing system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing system comprising: a plurality of processing devices; a plurality of memory devices; a circuit switch; and a controller to: identify first and second instruction-level portions to be consecutively executed by the computing system; determine a first subset of the plurality of processing devices and a first subset of the plurality of memory devices to be used to execute the first instruction-level portion; control the circuit switch to interconnect the first subset of the plurality of processing devices and the first subset of the plurality of memory devices during an execution of the first instruction-level portion; determine a second subset of the plurality of processing devices and a second subset of the plurality of memory devices to be used to execute the second instruction-level portion; and control the circuit switch to interconnect the second subset of the plurality of processing devices and the second subset of the plurality of memory devices during an execution of the second instruction-level portion, wherein a first temporary configuration comprises the first subset of the plurality of processing devices and the first subset of the plurality of memory devices, wherein a second temporary configuration comprises the second subset of the plurality of processing devices and the second subset of the plurality of memory devices; determine a performance benefit of the second temporary configuration; determine a performance cost of the second temporary configuration; determine whether the performance benefit exceeds the performance cost; and in response to a determination that the performance benefit exceeds the performance cost, initiate the second temporary configuration in the computing system.

2. The computing system of claim 1, wherein:
the performance benefit is an estimated reduction in execution time for use of the second temporary configuration to execute the second instruction-level portion; and
the performance cost is an estimated loss of processing time to initiate the second temporary configuration.

3. The computing system of claim 1, wherein the controller is further to:
determine whether the second temporary configuration is different from the first temporary configuration; and
initiate the second temporary configuration in response to a determination that the second temporary configuration is different from the first temporary configuration.

4. The computing system of claim 1, wherein the circuit switch is an optical circuit switch to route signals within the optical domain.

5. The computing system of claim 1, wherein the circuit switch is an electrical circuit switch to route electrical signals, and wherein the electrical circuit switch does not process data packets.

6. The computing system of claim 1, the controller to:
analyze an upcoming workload of the computing system; and
divide the upcoming workload into portions at a plurality of granularity levels comprising jobs, microservices, and instructions.

7. The computing system of claim 1, wherein the first instruction-level portion comprises a looped instruction to be repeated for a plurality of iterations, and wherein the plurality of processing devices comprises:
a plurality of general purpose processors; and
a plurality of special purpose processors.

8. A method comprising: identifying, by a controller of a computing system, first and second instruction-level portions to be consecutively executed by a computing system, the computing system comprising a plurality of processing devices, a plurality of memory devices, and a circuit switch; determining, by the controller, a first subset of the plurality of processing devices and a first subset of the plurality of memory devices to be used to execute the first instruction-level portion; controlling, by the controller, the circuit switch to interconnect the first subset of the plurality of processing devices and the first subset of the plurality of memory devices during an execution of the first instruction-level portion; determining, by the controller, a second subset of the plurality of processing devices and a second subset of the plurality of memory devices to be used to execute the second instruction-level portion; and controlling, by the controller, the circuit switch to interconnect the second subset of the plurality of processing devices and the second subset of the plurality of memory devices during an execution of the second instruction-level portion, wherein a first temporary configuration comprises the first subset of the plurality of processing devices and the first subset of the plurality of memory devices, wherein a second temporary configuration comprises the second subset of the plurality of processing devices and the second subset of the plurality of memory devices determining a performance benefit of the second temporary configuration; determining a performance cost of the second temporary configuration; determining whether the performance benefit exceeds the performance cost; and in response to a determination that the performance benefit exceeds the performance cost, initiating the second temporary configuration in the computing system.

9. The method of claim 8, wherein:
the performance benefit is an estimated reduction in execution time for use of the second temporary configuration to execute the second instruction-level portion; and
the performance cost is an estimated loss of processing time to initiate the second temporary configuration.

10. The method of claim 8, further comprising:
determining whether the second temporary configuration is different from the first temporary configuration; and
initiating the second temporary configuration in response to a determination that the second temporary configuration is different from the first temporary configuration.

11. The method of claim 8, further comprising: executing the first instruction-level portion using the first subset of the plurality of processing devices and the first subset of the plurality of memory devices, comprising performing a plurality of iterations of a looped instruction.

12. A non-transitory machine-readable medium storing instructions that upon execution cause a processor to: identify first and second instruction-level portions to be consecutively executed by a computing system, the computing system comprising a plurality of processing devices, a plurality of memory devices, and a circuit switch; determine a first subset of the plurality of processing devices and a first subset of the plurality of memory devices to be used to execute the first instruction-level portion; control the circuit switch to interconnect the first subset of the plurality of processing devices and the first subset of the plurality of memory devices during an execution of the first instruction-level portion; determine a second subset of the plurality of processing devices and a second subset of the plurality of memory devices to be used to execute the second instruction-level portion; and control the circuit switch to interconnect the second subset of the plurality of processing devices and the second subset of the plurality of memory devices during an execution of the second instruction-level portion, wherein a first temporary configuration comprises the first subset of the plurality of processing devices and the first subset of the plurality of memory devices, wherein a second temporary configuration comprises the second subset of the plurality of processing devices and the second subset of the plurality of memory devices; determine a performance benefit of the second temporary configuration; determine a performance cost of the second temporary configuration; determine whether the performance benefit exceeds the performance cost; and in response to a determination that the performance benefit exceeds the performance cost, initiate the second temporary configuration in the computing system.

13. The non-transitory machine-readable medium of claim 12, wherein:
the performance benefit is an estimated reduction in execution time for use of the second temporary configuration to execute the second instruction-level portion; and
the performance cost is an estimated loss of processing time to initiate the second temporary configuration.

14. The non-transitory machine-readable medium of claim 12, wherein the circuit switch is an optical circuit switch that routes signals within the optical domain.

* * * * *